(12) United States Patent
Fayer et al.

(10) Patent No.: US 12,449,096 B2
(45) Date of Patent: Oct. 21, 2025

(54) DEVICE FOR STORING CRYOGENIC FLUID

(71) Applicant: L'Air Liquide, Societe Anonyme pour l'Etude et l'Exploitation des Procedes Georges Claude, Paris (FR)

(72) Inventors: Thomas Fayer, Sassenage (FR); Patrick Bravais, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 643 days.

(21) Appl. No.: 17/574,065

(22) Filed: Jan. 12, 2022

(65) Prior Publication Data
US 2022/0221110 A1 Jul. 14, 2022

(30) Foreign Application Priority Data
Jan. 12, 2021 (FR) ................. FR 2100238

(51) Int. Cl.
*F17C 5/06* (2006.01)
*F17C 9/02* (2006.01)

(52) U.S. Cl.
CPC ................. *F17C 5/06* (2013.01); *F17C 9/02* (2013.01); *F17C 2201/0109* (2013.01);
(Continued)

(58) Field of Classification Search
CPC ...... F17C 5/06; F17C 9/02; F17C 2201/0109; F17C 2201/035; F17C 2205/0352;
(Continued)

(56) References Cited

U.S. PATENT DOCUMENTS 5,176,174 A   1/1993  Toraason et al.
6,047,747 A * 4/2000  Bowen .................... F17D 1/082
                                                        420/92
(Continued)

FOREIGN PATENT DOCUMENTS

DE   10 2012 200554       7/2013
DE   10 2017 206346      10/2018
EP       1722152 A2 * 11/2006  ............. F17C 5/007
FR       1 402 554        6/1965
WO   WO-2016004033 A2 *  1/2016  ................ F17C 1/00

OTHER PUBLICATIONS

French Search Report for FR 2100238, mailed Sep. 16, 2021.

*Primary Examiner* — Miguel A Diaz
*Assistant Examiner* — Ibrahim A Michael Adeniji
(74) *Attorney, Agent, or Firm* — Justin K. Murray

(57) ABSTRACT

A device for storing cryogenic fluid comprising a tank extending in a longitudinal direction and suitable for containing liquefied gas in equilibrium with a gas phase, a device for pressurizing the tank, the pressurization device comprising a pressurized gas generator and a rail for injecting the pressurized gas extending in the longitudinal direction in the upper portion of the tank, the injection rail comprising a plurality of gas outlet orifices spaced apart in the longitudinal direction, characterized in that at least one of the spacing between the orifices, the diameter of the orifices and the number of the orifices is different in the longitudinal direction between a first so end through which the gas enters the rail and an opposite second end of the rail and configured to render the flow rates leaving the orifices of the rail uniform in the longitudinal direction.

11 Claims, 3 Drawing Sheets

(52) U.S. Cl.
CPC ............................. *F17C 2201/035* (2013.01);
*F17C 2205/0352* (2013.01); *F17C 2223/0161*
(2013.01); *F17C 2225/0123* (2013.01); *F17C
2227/0302* (2013.01)

(58) Field of Classification Search
CPC ...... F17C 2223/0161; F17C 2225/0123; F17C
2227/0302; F17C 2201/0119; F17C
2201/054; F17C 2201/056; F17C
2223/033; F17C 2223/041; F17C
2223/046; F17C 2225/044; F17C
2227/0107; F17C 2227/0393; F17C
2250/0626; F17C 2260/025; F17C
2260/031; F17C 13/005; F17C 3/00;
F17C 13/00; F17C 2221/00; F17C
2227/0369; F17C 13/025; F17C
2201/0104; F17C 2201/052; F17C
2250/032
USPC ............................. 220/581; 222/464; 62/45.1
See application file for complete search history.

(56) References Cited

U.S. PATENT DOCUMENTS

| | | | |
|---|---|---|---|
| 6,503,584 B1* | 1/2003 | McAlister | F17C 1/02 |
| | | | 220/560.04 |
| 6,898,985 B1* | 5/2005 | Gautreau | F17C 13/02 |
| | | | 62/45.1 |
| 9,494,282 B2 | 11/2016 | Kampitsch et al. | |
| 2006/0037328 A1* | 2/2006 | Hall | F17C 9/00 |
| | | | 62/45.1 |
| 2011/0220003 A1 | 9/2011 | Colmard et al. | |
| 2014/0326737 A1* | 11/2014 | Kampitsch | F17C 3/04 |
| | | | 222/464.2 |
| 2015/0345708 A1* | 12/2015 | Sloan | F17C 13/002 |
| | | | 220/560.12 |
| 2016/0341361 A1* | 11/2016 | Fanger | F17C 13/026 |
| 2020/0025338 A1* | 1/2020 | Petitpas | F17C 7/04 |
| 2020/0363016 A1* | 11/2020 | Gambone | F17C 13/04 |

\* cited by examiner

[Fig. 1]
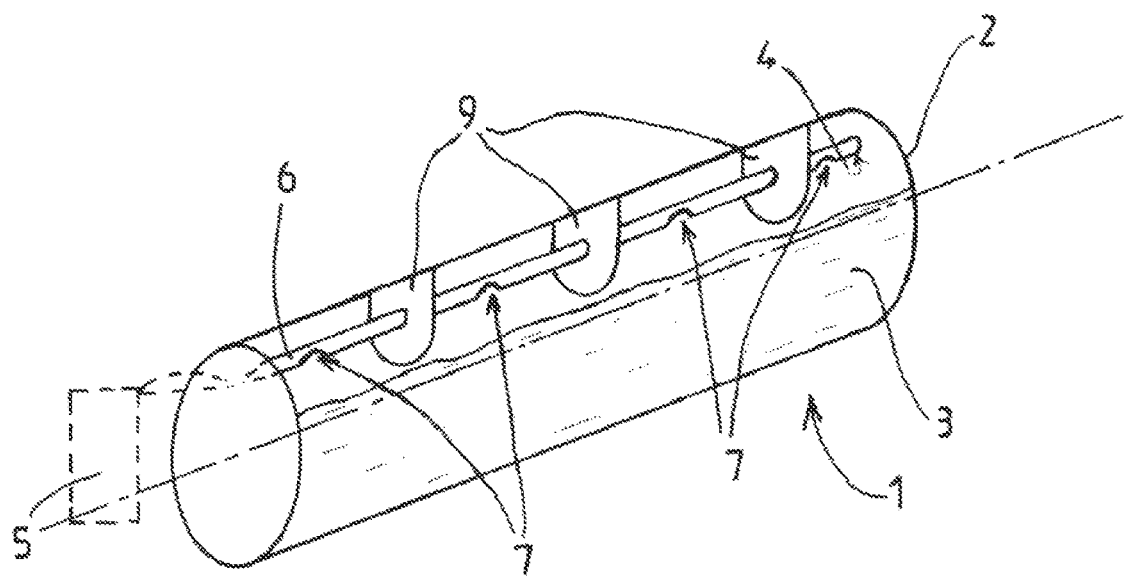
[Fig. 2]
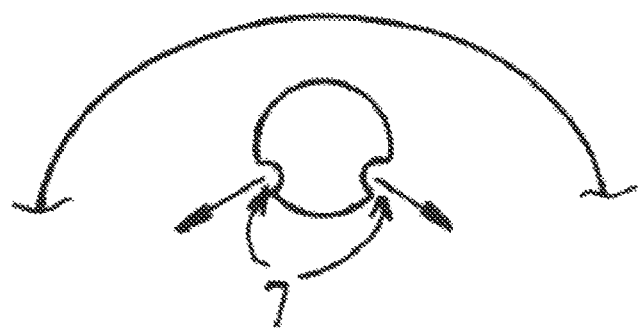

[Fig. 3]
[Fig. 4]
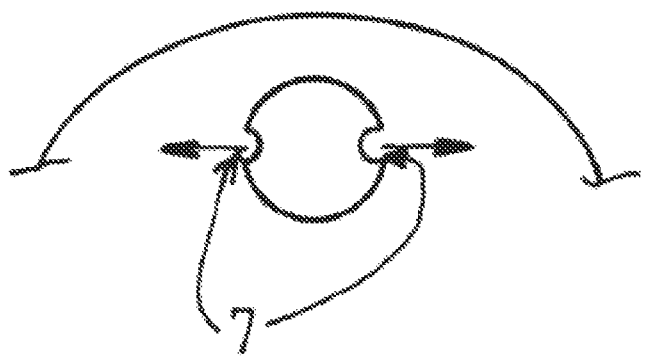

[Fig. 5]
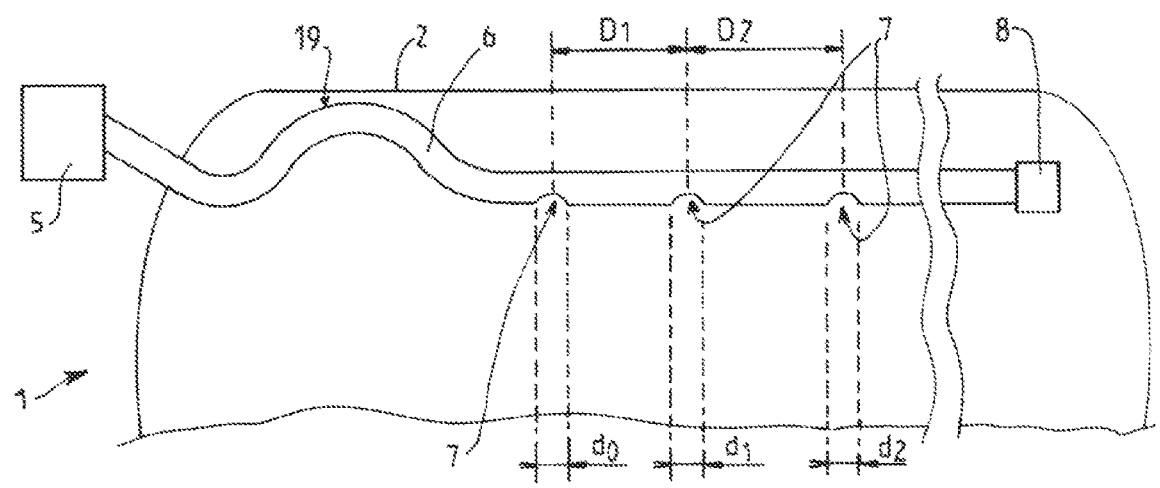

DEVICE FOR STORING CRYOGENIC FLUID

CROSS-REFERENCE TO RELATED APPLICATIONS

This application claims the benefit of priority under 35 U.S.C. § 119 (a) and (b) to French patent application No. FR 2100238, filed Jan. 12, 2021, the entire contents of which are incorporated herein by reference.

BACKGROUND

Field of the Invention

The invention relates to a device for storing cryogenic fluid.

The invention relates more particularly to a device for storing cryogenic fluid comprising a tank extending in a longitudinal direction and suitable for containing liquefied gas in equilibrium with a gas phase, a device for pressurizing the tank, the pressurization device comprising a pressurized gas generator and a rail for injecting the pressurized gas extending in the longitudinal direction in the upper portion of the tank, the injection rail comprising a plurality of gas outlet orifices spaced apart in the longitudinal direction.

Related Art

In some applications, to withdraw liquid from a cryogenic tank, the tank must first be pressurized so that there is sufficient pressure difference for the transfer. In addition, this pressure must also be maintained during the transfer.

In a known solution, an atmospheric heater is placed under the tank to make it possible to pressurize part of the liquid contents of the storage tank by vaporizing it. The overheated, vaporized gas is then reinjected into the expansion space of the tank. For example, see FR1402554A.

The reinjected gas tends however to heat the cryogenic liquid present in the tank, reducing the pressurizing capacity of the expansion space and having a detrimental impact on the temperature of the liquid molecule (which should be kept as cold as possible).

These heat exchanges at the liquid/gas interface are greater the higher the reinjection velocity. Sub-optimal gas reinjection will therefore result in an increase in this undesirable heat exchange during the liquid transfer phases. The known reinjection systems disturb the boundary layer at the liquid/gas interface.

SUMMARY OF THE INVENTION

One aim of the present invention is to overcome all or some of the disadvantages of the prior art indicated above.

To this end, the device according to the invention, which meets the generic definition given in the preamble above, is essentially characterized in that at least one of the spacing between the orifices, the diameter of the orifices and the number of the orifices is different in the longitudinal direction between a first end through which the gas enters the rail and an opposite second end of the rail and configured to render the flow rates leaving the orifices of the rail uniform in the longitudinal direction.

The gas reinjection velocity field obtained is more uniform than in the prior art and makes it possible to concentrate the heat at the top of the gas dome, disturbing the boundary layer at the liquid/gas interface as little as possible. The stratification of the expansion space is improved.

Furthermore, embodiments of the invention can include one or more of the following features:
- at least some of the orifices have identical diameters and decreasing spacing from the first end towards the second end of the rail,
- at least some of the orifices have increasing diameters and constant spacing from the first end towards the second end of the rail,
- the second end of the rail comprises one flow control member of a convergent tube, a divergent tube and an orifice,
- the device comprises a plurality of orifices situated in at least one single longitudinal position on the rail,
- at least two of the plurality of orifices situated in a single longitudinal position on the rail are oriented differently in the tank in one of the following configurations: the orifices are situated opposite each other on either side of the periphery of the rail; the orifices are oriented towards the top and/or towards the bottom of the tank,
- the sum of the surface areas of the orifices is equal to the surface area of the inlet cross-section of the gas stream into the rail,
- the rail or the pipe to which the rail is connected outside the tank comprises, near the first end, an elbow situated above at least one portion of the rest of the rail extending towards the second end,
- the pressurized gas generator comprises a heater for the fluid drawn from the tank.

The invention can also relate to any alternative device or method comprising any combination of the features above or below within the scope of the claims.

BRIEF DESCRIPTION OF THE FIGURES

Further particular features and advantages will become apparent upon reading the following description, which is provided with reference to the figures, in which:

FIG. 1 is a partial transparent perspective view illustrating an example of the structure and operation of a first possible embodiment of the invention, FIG. 2 is a partial cross-sectional view of a detail of the device according to a first embodiment, FIG. 3 is a partial cross-section view of a detail of the device according to a second embodiment, FIG. 4 is a partial cross-sectional view of a detail of the device according to a third embodiment, FIG. 5 is a partial cross-sectional side view illustrating one exemplary embodiment of the structure and operation of the invention.

DETAILED DESCRIPTION OF THE INVENTION

The device 1 for storing cryogenic fluid illustrated by way of example comprises a tank 2, for example generally cylindrical, extending in a longitudinal direction A that is preferably horizontal when the tank 2 is in use configuration. The tank 2 is cryogenic, that is, configured to contain liquefied gas 3 (a liquid phase in the lower portion topped by a gas phase in the upper portion).

The device 1 further comprises a device 5, 6 for pressurizing the tank 2. This pressurization device conventionally comprises a pressurized gas generator 5 fluidly connected to a rail 6 for injecting the pressurized gas extending in the longitudinal direction A in the upper portion of the tank 2. In other words, the injection rail is situated in the upper half of the tank, particularly adjacent to the upper end of the tank.

The injection rail is thus situated in the gas phase of the tank. The pressurized gas generator 5 can comprise for example a heater for the fluid withdrawn in liquid form from the tank 2. The generator is configured to supply the injection rail 6 with pressurized gas.

For example, the injection rail 6 is fastened using plates 9 to the upper surface of the tank 2. For example, the rail 6 is situated at a distance from the uppermost portion of the tank 2 of between 10 mm and 200 mm.

The injection rail 6 is provided with a plurality of gas outlet orifices 7 distributed in the longitudinal direction A.

The spacing D1, D2, etc. between the orifices 7 and/or the diameter d0, d1, d2, etc. (or the cross-section) and/or the number of the orifices 7 varies in the longitudinal direction A between a first end through which the gas enters the rail 6 and an opposite second end of the rail 6, so as to render the flow rates leaving the orifices 7 of the rail 6 uniform in the longitudinal direction A. In other words, the surface areas of the orifices emerging into the tank vary in the longitudinal direction A.

The rail 6 preferably passes through the entire expansion space of the tank 2 (over its entire length or the majority of its length).

For example, at least some of the orifices 7 have identical diameters (or cross-sections) d0, d1, d2 and decreasing spacing D1, D2 from the first end towards the second end of the rail.

Alternatively or additionally, at least some of the orifices 7 have increasing diameters d0, d1, d2, etc., and constant spacing D1, D2, etc. from the first end towards the second end of the rail. These increasing diameters or cross-sections can also be obtained for example by adjusting the number of orifices 7.

For example, the sum of the surface areas of all of the orifices 7 can be equal to the surface area of the inlet cross-section of the gas stream into the rail 6.

The second end of the rail 6 preferably comprises one flow control member 8 of a convergent tube, a divergent tube and an orifice. This control member 8 is configured to contribute to controlling the flow rate and the injection velocity at the end of the rail 6.

As shown schematically in FIG. 2, FIG. 3 and FIG. 4, the rail 6 can include groups of a plurality of orifices 7 in one or more longitudinal positions.

For example, orifices 7 in the same group or two different groups can be oriented differently towards the inside of the tank 2.

For example, orifices 7 are situated opposite each other on either side of the periphery of the rail 6 (jets oriented laterally on each side towards the bottom of the tank 2 (see FIG. 3) and/or towards the top of the tank (see FIG. 3)) and/or the orifices are oriented laterally, substantially horizontally (see FIG. 4).

The orientation of the orifices 7, imparting the inclination to the gas jet, makes it possible to reduce the occurrence of convection cells and/or to reduce the heat exchanges at the wall of the tank 2.

The orifices can be positioned symmetrically or otherwise on the rail 6.

As illustrated in FIG. 5, the rail 6 can comprise, near the first end, an elbow 19 situated above at least one portion of the rest of the rail 6 extending towards the second end.

This makes it possible to prevent liquid from returning into the heater 5 if the rail 6 is partially submerged in liquid (waves in the tank 2 or steep inclination during use, for example). This embodiment is not however limiting. This elbow 19 could thus be formed outside the tank 2, for example on the portion of pipe supplying the rail 6 with gas.

The device makes it possible to reduce the pressurizing time in the tank 2. In addition, such an arrangement makes it possible to reduce the quantity of liquid used in the heater 5 (or equivalent) during transfers.

The heat transfers inside the tank 2 are also reduced at the liquid/gas interface. In addition, there is a potential reduction in the heating of the liquid present in the tank 2 via the stratification of the gas dome (due to the increased uniformity and reduction in the reinjection velocity field).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising in a claim is an open transitional term which means the subsequently identified claim elements are a nonexclusive listing i.e. anything else may be additionally included and remain within the scope of comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for storing cryogenic fluid comprising:
   a tank extending in a longitudinal direction and suitable for containing liquefied gas in equilibrium with a gas phase; and
   a device for pressurizing the tank, the pressurization device comprising a pressurized gas generator fluidly connected to an injection rail configured to inject the generated pressurized gas that extends in a longitudinal direction in an upper portion of the tank from a first end thereof, through which the generated pressurized gas enters the injection rail via an inlet, and an opposite second end thereof, wherein:

at each one of a plurality of different longitudinal positions along the injection rail are disposed one or more outlet orifices, the different longitudinal positions being longitudinally spaced from one another;

means for improving uniformity of flow rates of the generated pressurize gas injected by the orifices in the longitudinal direction, wherein the means for improving uniformity of flow rates comprises one or more of the following: (a) the longitudinal spacing decreases in the longitudinal direction from the first end to the second end, (b) a diameter of the one or more orifices at the different longitudinal positions increases in the longitudinal direction from the first end to the second end; and the pressurized gas generator comprises a heater for heating the liquefied gas withdrawn from the tank.

2. The device of claim 1, wherein at least some of the orifices have identical diameters and the longitudinal spacing decreases in the longitudinal direction from the first end to the second end.

3. The device of claim 1, wherein the diameter of the one or more orifices at the different longitudinal positions increases in the longitudinal direction from the first end to the second end and the longitudinal spacing is constant in the longitudinal direction from the first end to the second end.

4. The device of claim 1, wherein the second end comprises a convergent tube, a divergent tube, or an orifice.

5. The device of claim 1, wherein a plurality of orifices are disposed at at least one of the different longitudinal positions.

6. The device of claim 1, wherein:
two orifices are disposed and oriented differently at at least one of the different longitudinal positions; and
the different orientations are selected from one of the following configurations: opposite one another on either side of a periphery of the injection rail, and towards a top of the tank and towards a bottom of the tank.

7. The device of claim 1, wherein a sum of surface areas of the orifices is equal to a cross-sectional surface area of the inlet.

8. The device of claim 1, wherein the injection rail, or a pipe to which the injection rail is connected outside the tank, comprises, near the first end, an elbow situated above at least one portion of the rest of the injection rail extending towards the second end.

9. A method of pressurizing a cryogenic fluid, comprising the steps of:
providing the device of claim 1;
heating liquefied gas withdrawn from the tank using the heater to provide the generated pressurized gas; and
injecting the generated pressurized gas into the gaseous phase via the orifices.

10. The device of claim 1, wherein the longitudinal rail is disposed adjacent to an upper wall of the tank.

11. The device of claim 1, wherein the longitudinal rail is disposed in the upper portion of the tank such that the location of the longitudinal rail is configured to reduce interaction of the generated pressurized gas when injected into the tank.

* * * * *